May 6, 1958     C. H. LUST     2,833,357
ROOT CROP HARVESTING MACHINE
Filed Jan. 6, 1955     2 Sheets-Sheet 1
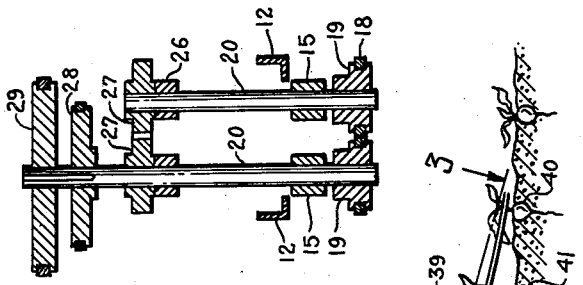
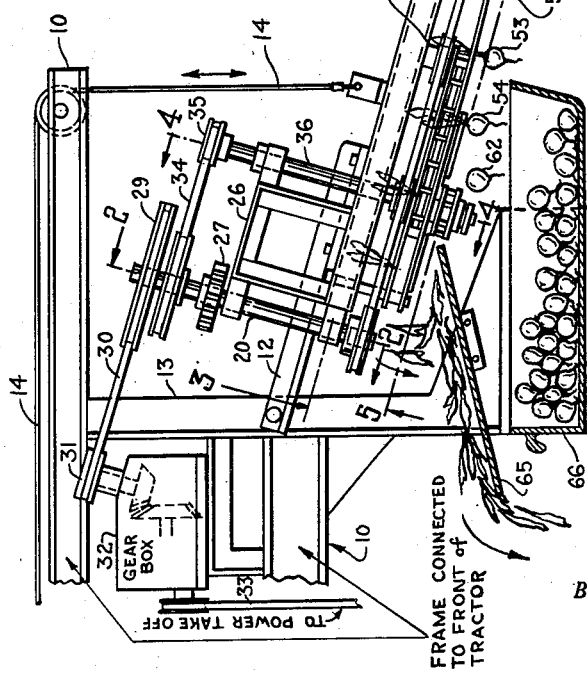
INVENTOR.
CALVIN H. LUST
BY Owen + Owen
ATTORNEYS May 6, 1958 C. H. LUST 2,833,357
ROOT CROP HARVESTING MACHINE
Filed Jan. 6, 1955 2 Sheets-Sheet 2
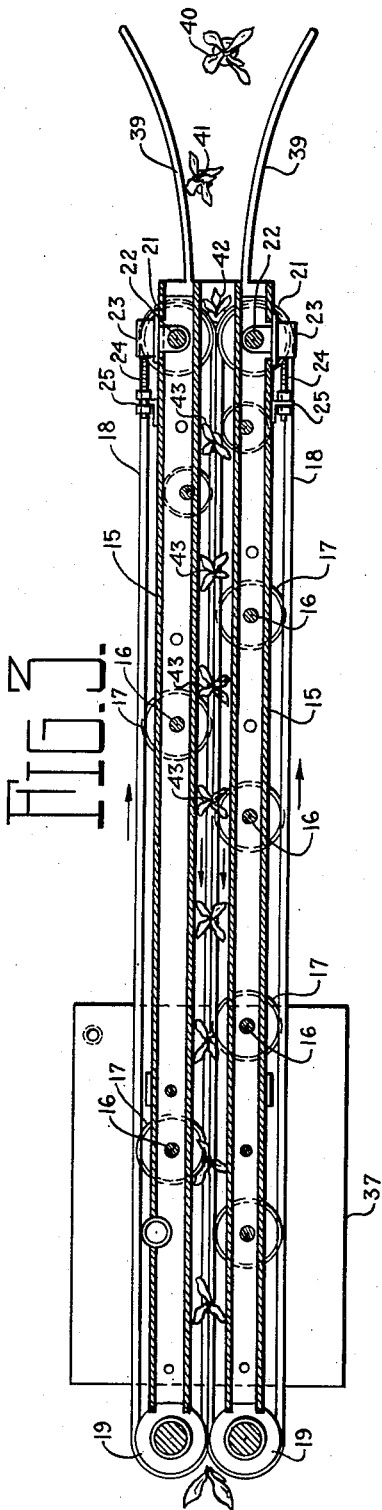
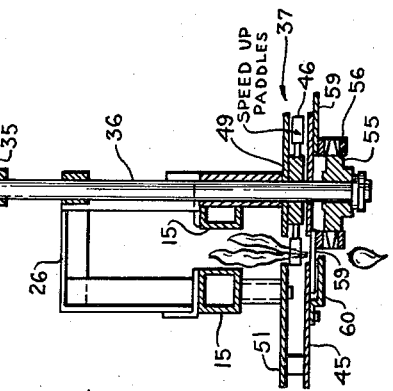
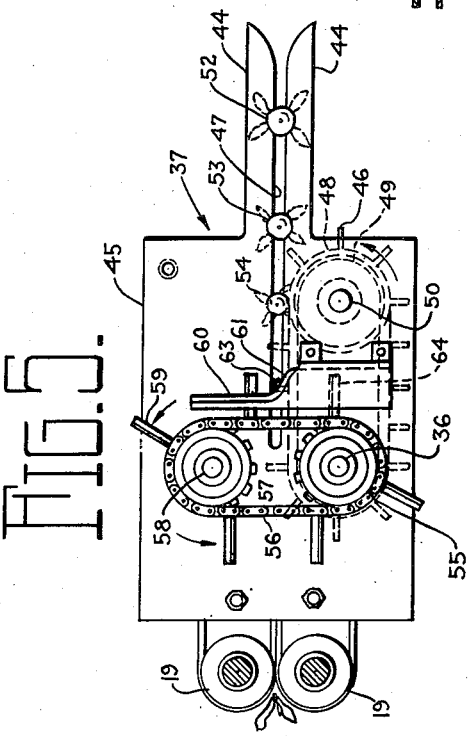
INVENTOR.
CALVIN H. LUST
BY Owen + Owen
ATTORNEYS

United States Patent Office 2,833,357
Patented May 6, 1958

2,833,357

ROOT CROP HARVESTING MACHINE

Calvin H. Lust, Chatfield, Ohio

Application January 6, 1955, Serial No. 480,105

7 Claims. (Cl. 171—37)

This invention relates to harvesting machines and particularly to machines designed for harvesting ground crops such as radishes, turnips, beets, etc., and the invention will be illustrated by reference to a machine specifically designed for digging and topping radishes.

Radishes for the market are not acceptable to the average housewife unless they are free from blemish, i. e., their skins are whole and not seriously damaged, and they should preferably be topped close to the radish bodies in order to eliminate the space wasting greens so that the vegetable in shipment occupies a lesser space. Because of the tenderness of the skin of the radish however, it is difficult to pick them mechanically without damage.

It is the principal object of this invention to provide a harvesting machine which will loosen the radishes in the earth, grasp the top leaves of each radish to lift it from the earth, carry the radish upwardly to a topping mechanism and gently but firmly locate the radish relative to the topping knives so that the top will be cut off close to the body but so that the body will not be abraded nor its skin damaged.

It is another object of this invention to provide a mechanism for a radish harvesting machine which will snub the forces acting to elevate the radish bodies adjacent the topping knives so that the bodies will not be appreciably abraded.

These and more specific objects and advantages will be better understood from the specification which follows and from the drawings in which:

Fig. 1 is a view in elevation of a radish harvesting machine embodying the invention, certain parts being broken away and certain parts being shown in section.

Fig. 2 is an enlarged vertical sectional view taken substantially on the line 2—2 of Fig. 1.

Fig. 3 is an approximately horizontal sectional view taken along the line 3—3 of Fig. 1.

Fig. 4 is an enlarged vertical sectional view taken along the line 4—4 of Fig. 1.

Fig. 5 is a bottom view, partly in section, taken from the position indicated by the line 5—5 of Fig. 1.

A harvesting machine embodying the invention is mounted on a frame generally indicated at 10 which may be permanently or removably mounted on the front end of a tractor or other farm machine. The harvesting machine has a main frame 11 pivotally connected by angle irons 12 to an upright frame member 13 of the main frame 10 and is supported on the front of the main frame 10 by a support cable 14 leading to a suitable winch and crank mounted on the tractor by means of which the harvesting frame 11 may be swung upwardly relative to the tractor mounted frame 10.

The harvesting machine frame 11 consists of a pair of box girders 15 which are parallel to each other and which are rendered structurally integral by cross members (not shown in detail). Each of the girders 15 journals a plurality of generally vertically extending shafts 16 spaced along the lengths of the girders 15 and on the lower end of each of which there is mounted an idler pulley 17. The idler pulleys 17 are grouped in two groups, one of which is spaced along each of the girders 15 and each group of idler pulleys is engaged by a lifting belt 18. Each of the lifting belts 18 is in turn engaged with one of a pair of driving pulleys 19 that are mounted upon the lower ends of parallel shafts 20 located at the upper end of the girders 15. The belts 18 are also engaged in a pair of adjustable idler pulleys 21 each of which is mounted on the lower end of a shaft 22 that is parallel to the shafts 16 and 20 but journalled in a sliding block 23. Each of the sliding blocks 23 is connected by an adjustment screw 24 to an ear 25 welded or otherwise rigidly secured to the outer face of one of the girders 15. By adjusting the screw 24 the pulleys 21 may be moved longitudinally of the girders 15 to adjust the tension on the lifting belts 18.

The two upper end shafts 20 which drive the driving pulleys 19 extend through upper frame members 26 (Fig. 2) erected above the two girders 15 and, near their upper ends, mount a pair of spur gears 27 which are meshed with each other. One of the shafts 20 extends upwardly an additional distance where it carries two pulleys 28 and 29. The pulley 29 (Fig. 1) may be driven by a belt 30 from an output pulley 31 of a gear box 32 that may be powered from a power take-off belt 33 leading to a power take-off mechanism on the tractor (not shown). Any other flexible and detachable power coupling from the tractor on its wheels to the mechanism of the invention may be employed, the particular means shown being merely illustrative. The pulley 28 is engaged by a belt 34 which also is engaged in a pulley 35 on the upper end of a jackshaft 36 mounted in the frame member 26 and extending downwardly through a topping casing generally indicated at 37 which is mounted on the underside of the girders 15.

At the forward lower side of the girders 15 there is rigidly mounted a plow 38 (Fig. 1) having such position and being so inclined, that it plows the earth some inches back of the foremost extension of the girders 15 and thus of the belts 18. On the front end of each of the girders 15 there also is mounted a gathering bar 39, the pair of bars 39 (see Fig. 3) being diverging and downwardly inclined (Fig. 1) so that they engage beneath and gather in the tops of the radishes as the harvesting machine moves longitudinally along a row of radishes. As the machine is moved with the plow 38 loosening the earth, the top of each successive radish, for example, the top of the radish indicated by the reference number 40 in Figs. 1 and 3, is engaged by the bars 39 and gathered inwardly and upwardly so that the leaves assume an upright position as in the case of the radish indicated by the reference number 41, being guided toward the vertical center line between the girders 15 until they enter the bite of the belts 18 between the inner edges of the pulleys 21. A radish indicated by the reference number 42 in Figs. 1 and 2 is in such position.

It should be observed that the frame girders 15 are so spaced laterally and the pulleys 17, 19 and 21 of such diameter that the inner webs of the belts 18 run in contact with each other. Thus as each radish top is led into the converging space between the bites of the belts 18, it is firmly grasped between the belts 18 and tractive force is applied to pull it upwardly out of the earth loosened by the plow 38 and carry it along the inclined path determined by the belts 18. In Figs. 1 and 3 a plurality of radishes each indicated by the reference number 43 are shown spaced from each other and moving up the path.

As each radish approaches the upper end of the path defined by the belts 18, the stems of its leaves enter between a pair of guide fingers 44 which are forward and slightly upwardly bent extensions of a bottom plate 45 (Fig. 5) of the topping casing 37. The topping casing 37 serves as a bearing plate for and houses mechanisms intended to snub the radishes upwardly against the underside of the plate 45 and to cleanly sever the stems. These mechanisms include a plurality of snubbing paddles 46 which move horizontally above a slot 47 in the plate 45 that is a continuation of the space between the fingers 44. The paddles 46 are mounted upon a belt or link chain 48 which is carried by a pair of spaced pulleys 49 that are mounted, one near the lower end of the jackshaft 36, and the other upon a stub shaft 50 that extends between the lower plate 45 and a spaced parallel upper plate 51 of the enclosure 37. The paddles 46 on their belt 48 are driven at a linear speed twice that of the linear speed of movement of the belts 18. The slot 47 is located beneath and extends parallelly with a portion of the inner web of belts 18 so that radishes depending from their leaves are led into the slot 47 by the belts 18. A radish in this position is indicated by the reference number 52 in the figures.

The downward curvature of the fingers 44 straightens out the radish leaves and, as the belts 18 continue to move upwardly, the radish progresses through the slot 47 until it reaches the position occupied by the radish indicated by the reference number 53 in the figures. The paddles 46 are spaced from each other along the belts 48 at such a distance that immediately after the radish reaches the position occupied by the radish 53 one of the paddles 46 swings in behind the stems of that radish and moves horizontally against the stems of such radish. A radish in this position is that indicated by the reference character 54 in the drawings. Because the paddles 46 are moving at a greater linear speed than the belts 18, the paddle 46 engaged with the stems of the radish pulls the stems ahead of the leaves. Since the leaves are held between the webs of the belts 18, they resist this forward movement and the stems are gradually snubbed over the paddle 46 which gently lifts the body of the radish up against the undersurface of the plate 45. The tension between the webs of the belts 18 is so adjusted that as soon as the body of a radish is against the underside of the plate 45, additional snubbing movement caused by the engaged one of the paddles 46, slides the leaves between the belts 18 so that the bodies are not bruised.

At the lower end of the jackshaft 36 there is pinned a sprocket 55 (Figs. 4 and 5) which is engaged with a chain 56 that also runs on an idler sprocket 57 mounted upon a spaced parallel stub shaft 58. The chain 56 carries a plurality of outwardly extending flat knives 59 so mounted upon the chain 56 that they slide along the undersurface of the plate 45. Since the line extending between the shafts 36 and 58 is perpendicular to the central line of the slot 47, the knives 59 are moved across the slot 47 by the chain 56. Each of the knives 59 is so sharpened that its cutting edge is at the top and thus each of the knives 59 is capable of severing the stems of a radish at the plane of the bottom of the plate 45 against which the radishes are gently snubbed by the speeded up action of the paddles 46.

A knife guard and shear 60 is mounted on the undersurface of the plate 45 extending thereacross and spaced downwardly from the plate 45 a distance sufficient to permit the knives 59 to be engaged above and held in place by the guard 60. The guard 60 is cut away, as at 61, at the intersection of the path of the knives 59 and the slot 47. Like the paddles 46 the knives have a linear speed in excess of that of the belts 18 and, therefore, they sweep across the slot 47 and shear the stems of the radishes against the edge of the slot 47.

A radish indicated by the reference number 62 in Fig. 1 and its stems indicated by the reference number 63 in Fig. 5 have just been severed in the position of the mechanism shown in the drawings by the action of a knife indicated by the reference number 64 in Fig. 5. The stem 63 and its leaves are carried on by the belts 18 until they are ejected from between the belts 18 as they go around the driving pulleys 19 at the upper end of their travel. The tops and stems fall on a deflector plate 65 (Fig. 1) and are discharged onto the ground. The severed radishes, i. e., the radish 62 in Fig. 1 and others, fall into a tray 66 carried by the frame 10 where they accumulate until the tray is full and replaced.

By reason of the snubbing action provided by the speeded up snubbing paddles 46 in engagement with the stems of the radishes, and the fact that the leaves of the radishes while grasped by the belts 18 are only loosely grasped, the snubbing action can be adjusted so that while it will lift a radish it will not raise the radish with sufficient force against the underside of the fingers 44 or plate 45 to bruise or damage its skin. Therefore, a harvesting machine embodying the invention and as illustrated in the drawings is capable of continuous harvesting of radishes at a linear speed of the mechanism in the order of, say 2 to 5 miles per hour, with substantially all of the radishes being undamaged and their stems and leaves being topped off cleanly just above the point of junction with the radish bodies.

Although only one complete harvesting mechanism is shown in the drawings and described in the foregoing specification, it will be apparent that several such mechanisms, say four, six or eight, could be mounted on the front of a single tractor or other machine for harvesting a similar number of rows of vegetables simultaneously.

I claim:

1. Mechanism for harvesting and topping a row crop having a body and stems and leaves growing upwardly from the body and that are to be removed, said mechanism comprising, in combination, a frame, means on said frame for lifting the bodies serially from the earth, means also on said frame for grasping the leaves and for feeding each of the bodies along an upwardly inclined path with the bodies dependent therefrom, means on said frame adjacent the upper end of said inclined path for moving a topping knife across said path in a plane normal to the direction of extent of said leaves away from said body, and means independent of said feeding means and engaging the stems between the leaves and the bodies for moving the bodies near to the plane of said knife as the bodies move along said path, whereby said knife severs the stems closely adjacent the bodies.

2. Mechanism according to claim 1 in which the means for moving the bodies near to the plane of the knife moves at a linear speed in excess of the speed of movement of the means for feeding the bodies along the upwardly inclined path.

3. Mechanism according to claim 2 in which the means for grasping the leaves and feeding the bodies along the path is a pair of upwardly inclined belts having their inner spans in contact.

4. Mechanism according to claim 3 in which the means for engaging the stems between the bodies and the grasped portion of the leaves is a series of spaced paddles movable along a portion of said path at a level above the plane of said knife and at a linear speed in excess of the speed of said belts.

5. Mechanism according to claim 3 in which the inner spans of said belts are tensioned to grasp the leaves of a body loosely.

6. Mechanism for harvesting and topping a row crop having a body and stems and leaves growing upwardly from the body and that are to be removed, said mechanism comprising, in combination, a pair of belts having their inner spans parallel and engaged and moving together along an upwardly inclined path, the lower ends of said belts being spaced above ground level to engage the leaves of each plant in said crop, a plate located below said belts and having a guide slot parallel to the path of movement of the inner span of said belts and npaced below said belts, a plurality of knives mounted for movement across said slot adjacent the underside of said plate, and a plurality of spaced stem-engaging paddles movable along said path between said plate and said belts at a lineal rate in excess of that of said belts for engaging the stems of said crop and snubbing the bodies of said crop against the underside of said plate, the engaged portions of said belts being so tensioned as to hold the leaves of said crop against the movement of the stems by said paddles and cause the leaves to slip when the bodies snub against said plate.

7. In a harvesting machine for a row crop vegetable having a body growing below ground level, stems growing upwardly from the body and leaves on the stems, said machine having upwardly extending continuous conveyor means for grasping the leaves of the vegetables and feeding them along a path with the bodies depending therefrom, the improvement comprising a guide plate having a stem guide slot aligned with said conveyor for the reception of the stems of the vegetables as they move along beneath said conveyor, a knife movable across said slot for severing the stems, and means engageable with the stems at a level above said plate and moving at a linear speed in excess of the linear speed of movement of said conveyor for advancing the stems relative to the leaves of a vegetable and lifting the body thereof upwardly against said plate, whereby said knife severs the stems closely adjacent the body.

References Cited in the file of this patent

UNITED STATES PATENTS

| | | |
|---|---|---|
| 1,883,666 | Flintjer | Oct. 18, 1932 |
| 2,197,225 | Pierson | Apr. 16, 1940 |
| 2,645,889 | Warner | July 21, 1953 |